United States Patent
Thornton (10) Patent No.: US 8,074,255 B2
(45) Date of Patent: Dec. 6, 2011

(54) ANALOG VIDEO SIGNAL TRANSMISSION OVER TWISTED-PAIR WIRES

(75) Inventor: Barry W. Thornton, Austin, TX (US)

(73) Assignee: ClearCube Technology, Inc., Austin, TX (US)

(*) Notice: Subject to any disclaimer, the term of this patent is extended or adjusted under 35 U.S.C. 154(b) by 1595 days.

(21) Appl. No.: 11/237,612

(22) Filed: Sep. 28, 2005

(65) Prior Publication Data

US 2006/0069829 A1    Mar. 30, 2006

Related U.S. Application Data

(60) Provisional application No. 60/613,783, filed on Sep. 28, 2004.

(51) Int. Cl.
*G06F 13/42* (2006.01)
*H04N 7/16* (2011.01)

(52) U.S. Cl. .......................... 725/148; 710/106

(58) Field of Classification Search .................. 725/105, 725/148
See application file for complete search history.

(56) References Cited

U.S. PATENT DOCUMENTS

| | | |
|---|---|---|
| 4,054,910 A | 10/1977 | Chou et al. |
| 4,210,927 A | 7/1980 | Yumde et al. |
| 4,338,597 A | 7/1982 | Steiner et al. |
| 4,707,672 A | 11/1987 | Duret et al. |
| 4,714,959 A | 12/1987 | Pshtissky |
| 4,893,175 A | 1/1990 | Fukada |
| 4,955,048 A | 9/1990 | Iwamura et al. |
| 5,010,399 A | 4/1991 | Goodman et al. |
| 5,089,886 A | 2/1992 | Grandmougin |
| 5,130,793 A | 7/1992 | Bordry et al. |
| 5,283,637 A | 2/1994 | Goolcharan |
| 5,367,273 A | 11/1994 | Georger et al. |
| 5,374,952 A | 12/1994 | Flohr |
| 5,389,900 A | 2/1995 | Georger |

(Continued)

FOREIGN PATENT DOCUMENTS

EP    0 468 450 A2    1/1992

(Continued)

OTHER PUBLICATIONS

Milton M. Anderson; "Video Services on Copper"; IEEE International Conference on Communications; Jun. 1991; pp. 302-306.

(Continued)

*Primary Examiner* — Kevin M Nguyen
*Assistant Examiner* — Cory Almeida
(74) *Attorney, Agent, or Firm* — Meyertons Hood Kivlin Kowert & Goetzel, P.C.; Jeffrey C. Hood (57) ABSTRACT

A video transmitting system may be configured to transmit, over extended length twisted-pair cables, video signals encoded in the Y/C video space. The system may comprise a source of RGB computer video signals. A video transmitter may be operable to convert the RGB video signals into a balanced luminance signal and a respective pair of balanced color difference signals. The video transmitting system may be further configured to transmit the balanced luminance signal and the pair of balanced color difference signals over respective extended length twisted-pair cables. The luminance signal may be transmitted over a non time-corrected cable in order to retain bandwidth, while the color difference signals may be transmitted over time-corrected cables, thereby reducing the visual degradation of the signals.

23 Claims, 6 Drawing Sheets

U.S. PATENT DOCUMENTS

| | | | |
|---|---|---|---|
| 5,428,806 A | | 6/1995 | Pocrass |
| 5,475,346 A | | 12/1995 | Mullett |
| 5,479,617 A | | 12/1995 | Nei |
| 5,517,236 A | | 5/1996 | Sergeant et al. |
| 5,528,286 A | | 6/1996 | Goolcharan |
| 5,541,640 A | * | 7/1996 | Larson ................ 348/14.15 |
| 5,577,042 A | | 11/1996 | McGraw, Sr. et al. |
| 5,585,851 A | | 12/1996 | Ebihara et al. |
| 5,621,455 A | | 4/1997 | Rogers et al. |
| 5,751,338 A | | 5/1998 | Ludwig, Jr. |
| 5,778,303 A | | 7/1998 | Shinozaki et al. |
| 5,786,844 A | | 7/1998 | Rogers et al. |
| 5,805,772 A | * | 9/1998 | Chou et al. ................ 704/255 |
| 5,926,509 A | | 7/1999 | Stewart et al. |
| 5,974,464 A | | 10/1999 | Shin et al. |
| 6,150,997 A | | 11/2000 | Asprey |
| 6,184,919 B1 | | 2/2001 | Asprey et al. |

FOREIGN PATENT DOCUMENTS

| | | |
|---|---|---|
| EP | 0 620 691 B1 | 10/1994 |
| FR | 002584555 A1 | 11/1987 |
| JP | 02-194796 | 8/1990 |
| JP | 08-037671 | 2/1996 |
| WO | 94/30012 | 12/1994 |

OTHER PUBLICATIONS

David W. Lin, Cheng-Tie Chen and T. Russell Hsing; "Video on Phone Lines: Technology and Applications"; Proceedings of the IEEE; Feb. 1995; pp. 175-193; vol. 83, Issue 2.

James L. Dixon, Alexander D. Gelman and Rajesh B. Khandelwal; "Interactive Multimedia Communications Experiment with a Network CD-i Prototype"; IEEE COMSOC International Workshop on Multimedia Communications; May 1994; 5 pages.

D. J. Bradshaw; "Interconnection and Routing"; IEE Colloquium on Video Standards and their Interconnection; Feb. 2, 1989; pp. 411-415.

G. Baker; "High Speed Access for Broadband Multi-Media Services"; Fifth IEE Conference on Telecommunications; Mar. 1995; pp. 120-124.

Stephen H. Lampen; "Video and UTP"; Advanced Motion Imaging Conference, The Society of Motion Picture and Television Engineers; Feb. 2, 1996; 26 pages; Seattle Washington.

* cited by examiner

ANALOG VIDEO SIGNAL TRANSMISSION OVER TWISTED-PAIR WIRES

PRIORITY CLAIM

This application claims benefit of priority of provisional application Ser. No. 60/613,783 titled "Y/C Video Signal Transmission Over Twisted-Pair Wires" and filed Sep. 28, 2004, which is hereby incorporated by reference as though fully and completely set forth herein.

BACKGROUND OF THE INVENTION

1. Field of the Invention

The present invention relates generally to computer systems and specifically to the extension of video interface operational cable distance.

2. Description of the Related Art

Figure 1A:
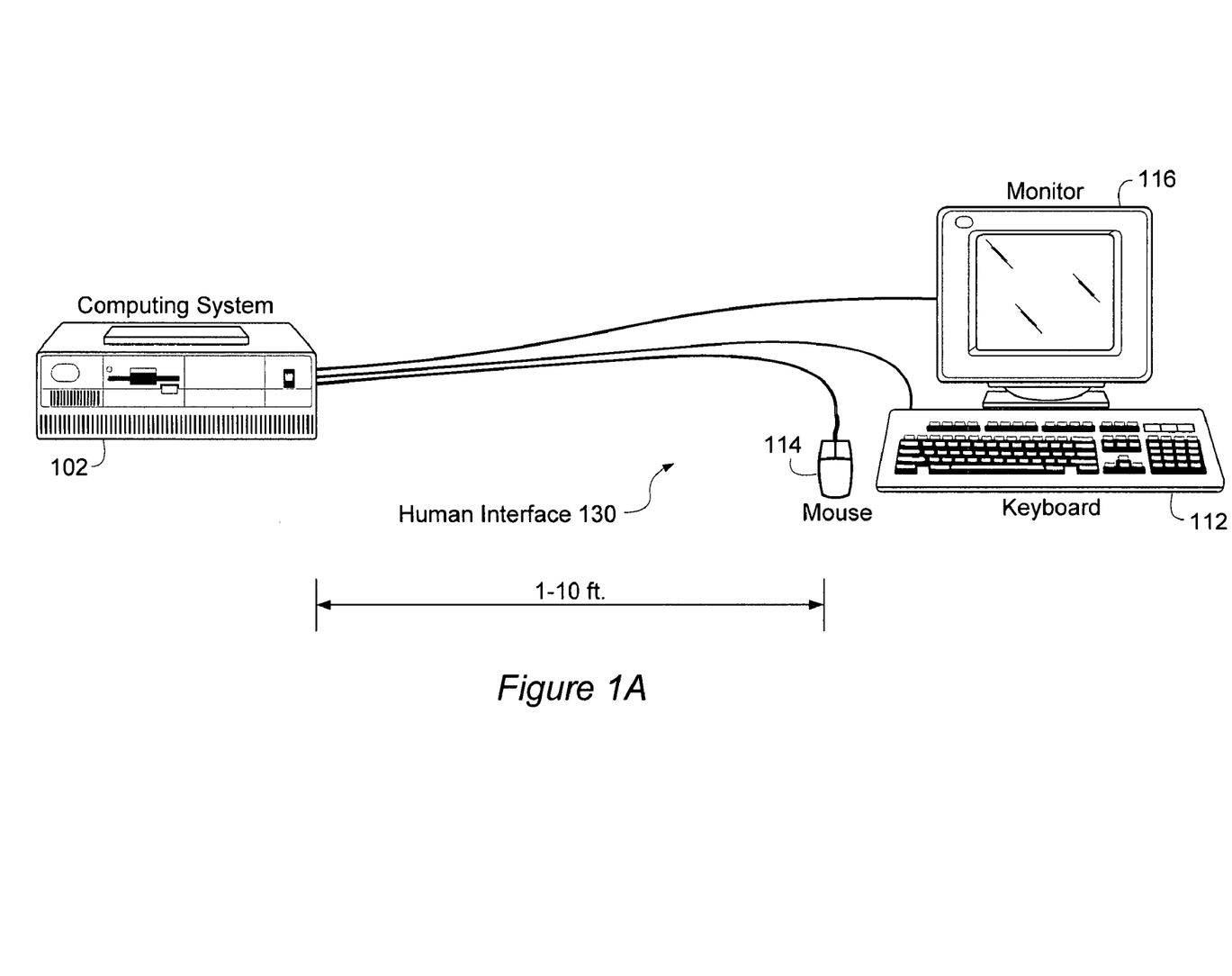
FIG. 1A shows a prior art computer system having a computing system and human interface devices directly coupled to the computing system through standard human interface cables.

The components of a computer system (such as PCs, minicomputers and mainframes) may be divided into two functional units, as illustrated in FIG. 1A—the computing system 102 and the human interface (or "HI") to the computing system. For a PC, the computing system may be the CPU, memory, hard drive, power supply and similar components. The computing system may be comprised in a chassis which holds the motherboard, power supply, hard drive and the like. The human interface, on the other hand, may comprise those devices that humans use to transfer information to and/or receive information from the computing system. The most commonly recognized devices which form part of the human interface with the computing system include the monitor, keyboard, mouse and printer. The human interface may comprise a variety of other devices, such as a joystick, trackball, touchpad, microphone, speakers, and telephone, as well as other devices too numerous to specifically mention.

Figure 1B:
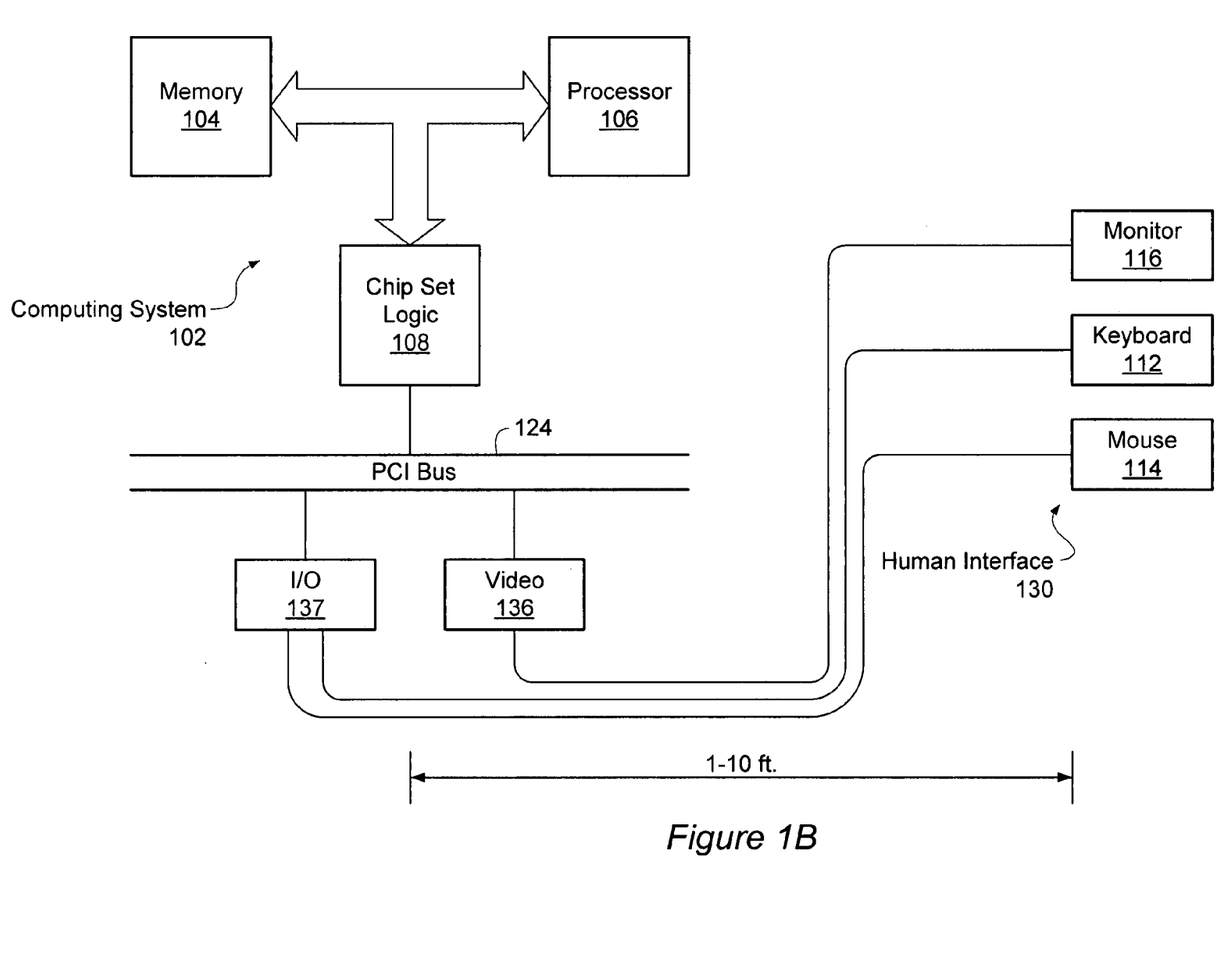
FIG. 1B is a block diagram of the prior art computer system of FIG. 1A.

In current computer systems, e.g., current PC architectures, the human interface (e.g., the display monitor, mouse, and keyboard, etc.) is closely located to the computer system, by a distance typically less than about 10 feet. The computing system 102 generates and/or receives human interface signals, e.g., display monitor, mouse and keyboard formatted data, that are provided directly to/from the human interface 130 or desktop via individual specialized cables as illustrated in prior art FIG. 1A. For example, for most PCs installed at workstations, the computer monitor 116, keyboard 112 and mouse 114 rest on the desktop while the computer chassis which holds the computing system 102 rests on the floor underneath the desktop. Prior art FIG. 1B is a block diagram of the computer system illustrated in FIG. 1A. As indicated in FIG. 1B, the computing system 102 typically includes a processor 106, i.e., a CPU, a memory 104, and I/O interface logic, such as a video card 136 and an I/O interface card 137 which are coupled to the processor 106 through an I/O bus 124. The computing system 102 also typically includes chip set logic 108 for interfacing the processor 106 and memory 104 with the I/O bus 124. As is well known, two or more computing systems 102 may be connected together in a network configuration.

In order to fully resolve the aforementioned issues, in some current systems the entire computing system is physically separated from the human interface, specifically, by keeping the human interface (monitor, keyboard, mouse and printer) at the desktop or workstation while relocating the associated computing system (motherboard, power supply, memory, disk drives, etc.) to a secured computer room where plural computing systems are maintained. By securing the computing systems in one room, the employer's control over the computer systems is greatly enhanced. For example, since employees no longer have personal access, through the floppy or CD drive, to the memory subsystem, employees can not surreptitiously remove information from their computing system. Nor can the employee independently load software or other data files onto her computing system. Similarly, the employee can no longer physically change settings or otherwise modify the hardware portion of the computer. Maintenance is also greatly facilitated by placement of all of the computing systems in a common room. For example, the repair technicians and their equipment can be stationed in the same room with all of the computing systems. Thus, a technician could replace failed components or even swap out the entire unit without making repeated trips to the location of the malfunctioning machine. Such a room can be provided with special HVAC and power systems to ensure that the room is kept clean, cool and fully powered.

U.S. Pat. No. 6,012,101 titled "Computer Network Having Commonly Located Computer Systems"; U.S. Pat. No. 6,119,146 titled "Computer Network Having Multiple Remotely Located Human Interfaces Sharing a Common Computing System"; U.S. Pat. No. 6,038,616 titled "Computer System With Remotely Located Interface Where Signals are Encoded at the Computer System, Transferred Through a 4-wire Cable, and Decoded at the Interface" disclose systems where a plurality of computing systems are located at one location, and the human interfaces associated with these computing systems are remotely located at respective desktops.

Figure 2:
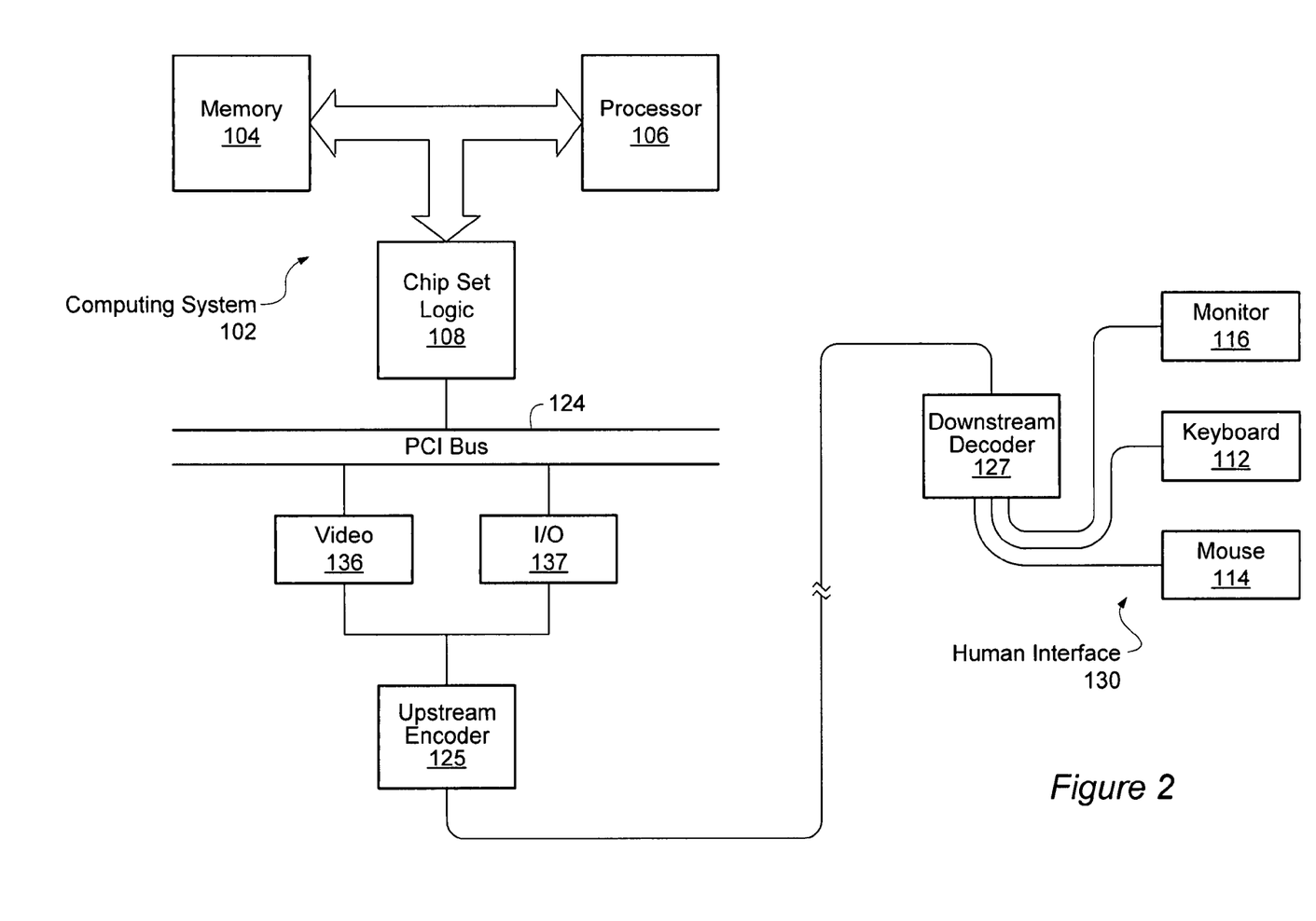
FIG. 2 is a block diagram of a prior art computer system having a computing system and one or more human interface devices remotely located from the computing system, where the computing system generates human interface signals that are encoded for transmission to the remote location and then converted back to human interface signals for provision to the one or more human interface devices.

FIG. 2 illustrates an exemplary prior art system where the human interface is remotely located from the computing system. The system of FIG. 2 includes a computing system, an upstream encoder, a communication medium, a downstream decoder, and the human interface devices. The downstream decoder and the human interface devices are located remotely from the upstream encoder and the computing system. This system employs a protocol wherein human interface signals generated by the computing system are encoded by the upstream encoder into a format which allows transmission over a lengthy distance to the remote location where the human interface devices are located. The encoded signals are then transmitted over the communication medium. The encoded human interface signals are received and decoded by the downstream decoder at the remote location, being converted back into the originally generated human interface signals for propagation to the human interface devices. Human interface signals generated by the human interface devices are similarly encoded by the downstream decoder, transmitted over the communication medium, decoded by the upstream encoder, and provided to the computing system. Thus, to date the separation of the computing system from the human interface has involved extension of the human interface signals, (monitor, mouse, keyboard, USB and other I/O signals), i.e., extensions of already existing I/O signals, that is, the human interface signals are generated by the computer (or human interface device), are changed or reformatted as needed for transmission to a distant or remote location, and then converted back to their original format.

As illustrated in FIG. 2, the remotely located human interface includes a monitor used to display information on the screen. While using monitors when the human interface is located near the computer system itself is commonplace, it may not be practical to do so when the human interface is located remotely from the computer system. The distance at which the computer video signals may be transferred is typically limited, as the computer video signals may suffer considerable line losses. Furthermore, the transfer of computer video signals over a significant distance may require dedicated video cabling with possible special cable considerations. For example, multiple coaxial cables may be required to transfer computer video signals from a computer system to a remote display. Due to the cost and bulkiness of coaxial cables, this may be a less than desirable solution. Furthermore, the cabling requirements for transferring computer video signals over a distance may leave no bandwidth for additional signals. Thus, any requirement for additional signals to be transferred to a remote location along with computer video signals may require additional cables beyond those already necessary. Such a solution may be both costly and logistically difficult to implement.

Certain prior art systems have operated to transfer analog R, G, B signals over twisted pair wiring at distances greater than 10 feet. However, improved methods are desired for transmitting analog video signal over a communication medium having distances greater than 10 feet.

Other corresponding issues related to the prior art will become apparent to one skilled in the art after comparing such prior art with the present invention as described herein.

SUMMARY OF THE INVENTION

In one embodiment, the system includes a host computer having a processor and a memory, a display device, and one or more peripheral devices, e.g., one or more USB peripherals. The system may include a local extender operable to couple to the host computer system and a remote extender operable to couple to the local extender and to the display device and the one or more peripherals. The extender may extend the distance between the host computer and the display/peripherals beyond what is generally achievable through standard video/display and/or peripheral (keyboard, mouse, etc.) cables, which typically cover distances up to 10 ft. One example of an extended distance may be—but not limited to—100 feet. The local extender may include a video transmitter and a host controller both of which may be operable to couple to the host computer system. The remote extender may include a video receiver operable to couple to the display device and a remote USB interface device operable to couple to the one or more peripherals. In one embodiment the USB interface device may be a Remote Root Hub.

In one embodiment, a standard computer video output generated by the host computer may comprise RGB and Synchronization signals, which may be encoded using the video transmitter into a single-ended luminance signal and two single-ended color difference signals. The two single-ended color difference signals may then be combined through a quadrature modulation process to create a single single-ended video chrominance signal. The luminance signal and the chrominance signal may be converted from single-ended (unbalanced) to balanced signals through respective converters, and may be transmitted over respective twisted-pair wires coupling to the video receiver located in the remote extender. Within the remote extender, through the video receiver, the balanced signals may be converted back from balanced to unbalanced, or single-ended, format. Subsequently, the single single-ended video chrominance signal may be used to recover the two color difference signals through quadrature demodulation. The single-ended luminance signal and the two single-ended color difference signals may then be decoded into the standard monitor format of RGB signals and Synchronization (Sync) signals, using a decoder also comprised in the video receiver.

In one embodiment, the three primary color signals, Red, Green and Blue, are matrixed into a luminance and chrominance signal set for transmission over time shifting Category Communications cable. The signal set may include a luminance signal obtained by summing the red, green and blue signals, and two color difference signals. One color difference signal may be obtained by subtracting the luminance signal from either the red, green or blue signal, and the other color difference signal may be obtained by subtracting the luminance signal from one of the other two remaining primary color signals. For example, if the first color difference signal was obtained by subtracting the luminance signal from the red signal, the other color difference signal may be obtained by subtracting the luminance signal from either the blue signal or from the green signal.

The luminance signal and the two color difference signals may be converted from single-ended (or unbalanced) format to balanced format, and transmitted over respective Category communications cables with the luminance signal transmitted on the shortest, or non time-corrected twisted-pair cable, and the two color difference signals may be transmitted on the other two, respectively longer twisted-pair cables. Upon receipt at the remote extender on the other end of each respective twisted-pair cable, the luminance and two color difference signals may be 'time aligned' using standard delay lines on the two longest twisted-pair cables. Once the three signals have been time aligned, they may be converted back from balanced to single-ended format, and de-matrixed to reconstruct the original red, green and blue video signals. The particular combination or order of the component video signals is not critical to the performance of the system. In addition, multiple variations of summing and differencing the components may be implemented.

By transmitting the luminance signal over a non time-corrected line, the signal bandwidth may be retained, while transmitting the color difference signals over time-corrected lines, the visual degradation of the signals may be reduced. Equal levels of the Red, Green and Blue component signals may be used when creating the luminance and color difference signals. Thus, various embodiments of the systems and methods described above may facilitate using Y/C video for computer graphics, and using twisted-pair cabling for the transfer of Y/C computer graphic signals over an extended distance.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DESCRIPTION OF THE PREFERRED EMBODIMENTS

Incorporation by Reference

The following patents and patent applications are hereby incorporated by reference as though fully and completely set forth herein:

U.S. Pat. No. 6,012,101 titled "Computer Network Having Commonly Located Computer Systems" issued on Jan. 4, 2000, whose inventors are Andrew Heller, Barry Thornton, Daniel Barrett, and Charles Ely;

U.S. Pat. No. 6,119,146 titled "Computer Network Having Multiple Remotely Located Human Interfaces Sharing a Common Computing System" issued on Sep. 12, 2000, whose inventors are Andrew Heller, Barry Thornton, Daniel Barrett, and Charles Ely;

U.S. Pat. No. 6,038,616 titled "Computer System With Remotely Located Interface Where Signals are Encoded at the Computer System, Transferred Through a 4-wire Cable, and Decoded at the Interface" issued on Mar. 14, 2000, whose inventors are Andrew Heller, Barry Thornton, Daniel Barrett, and Charles Ely;

U.S. Pat. No. 6,070,214 titled "Serially Linked Bus Bridge For Expanding Access Over A First Bus To A Second Bus" issued on May 30, 2000, whose inventor is Frank Ahern;

U.S. Pat. No. 5,764,924 titled "Method And Apparatus For Extending A Local PCI Bus To A Remote I/O Backplane" issued on Jun. 9, 1998, whose inventor is Soon Chul Hong;

U.S. Pat. No. 6,003,105 titled "Long-Haul PCI-to-PCI Bridge" issued on Dec. 14, 1999, whose inventors are Dominique Vicard, Jean-Paul Moiroux, and Pierre-Yves Thoulon;

U.S. patent application Ser. No. 09/728,667 titled "Computer On A Card With A Remote Human Interface" filed on Dec. 1, 2000, whose inventors are Andrew Heller and Barry Thornton; and U.S. patent application Ser. No. 09/728,669 titled "A System Of Co-Located Computers In a Framework Including Removable Function Modules for Adding Modular Functionality" filed on Dec. 1, 2000, whose inventor is Barry Thornton.

U.S. patent application Ser. No. 09/619,989 titled "System and Method for Providing a Remote Universal Serial Bus" filed on Jul. 20, 2000, whose inventor is Barry Thornton.

U.S. patent application Ser. No. 09/680,760 titled "System and Method for Combining Computer Video and Remote Universal Serial Bus In An Extended Cable" filed on Oct. 6, 2000, whose inventor is Barry Thornton.

Digital Visual Interface Specification, Version 1.0, Apr. 2, 1999.

A system and method for transferring computer video signals to a remote location is disclosed. In one embodiment, a computer in a first location is coupled to a video display device (e.g. a computer monitor) in a second location, wherein the second location is remote from the first location. The computer system may be configured to generate RGB signals. In alternative embodiments the computer system may be configured to generate Digital Video Interface (DVI) signals, which may be converted to analog video signals, typically RGB signals. The analog video signals may be transmitted to the second location across a cable, such as a CAT-5 cable. The analog video signals may be sent to the display device. The video signals may generate images presented on the display device.

In one embodiment, control signals may also be transmitted across the cable from the first location to the second location. The control signals may be multiplexed, and may be transmitted in their original digital format, or may be converted to analog control signals. In one embodiment, the control signals may be time-division multiplexed and transmitted digitally across the cable. In another embodiment, the control signals may be converted into an analog format and may be multiplexed with one or more of the video signals. The analog control signals may be time-division multiplexed or frequency division multiplexed with the analog video signals prior to transmission to the second location. At the second location, the analog control signals may be de-multiplexed from the analog video signals and reconverted into a digital format, where they may be sent to the digital display device.

A clock signal may also be transmitted from the first location to the second location. In one embodiment, the clock signal may be transmitted from the first location to the second location in a digital format. In another embodiment, the clock signal may transmitted as an embedded clock signal. In one embodiment, the clock signal may be embedded by first multiplexing it with the control signals. The clock and/or control signals may also be converted into an analog format, which may occur before or after multiplexing. The multiplexed clock/control signals may then be multiplexed with the video signals using either time-division multiplexing or frequency division multiplexing, and transmitted to the second location. At the second location, the clock/control signals may be de-multiplexed from the video signals and converted into a digital format, and de-multiplexed from each other in order to reproduce the separate clock and control signals. The clock and control signals, once reconverted into their original digital format and de-multiplexed may then be sent to the digital display device.

In various embodiments, auxiliary signals may also be transmitted across the cable. Such auxiliary signals may include, but are not limited to, universal serial bus (USB) signals, audio signals, and signals required for a human interface the computer system.

Figure 3:
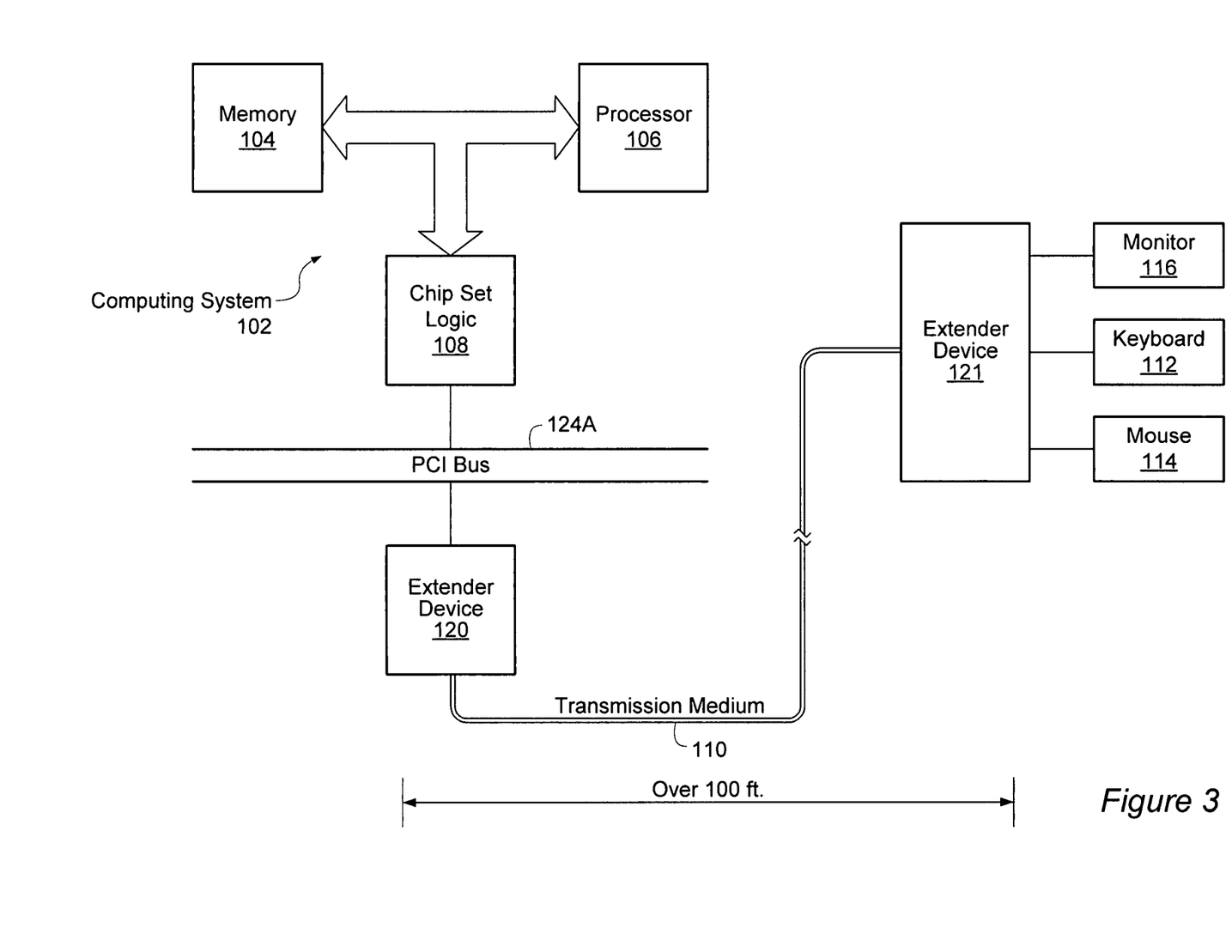
FIG. 3 shows one embodiment of a system that transmits encoded computer video signals over twisted-pair cabling.

In one embodiment, the system includes a host computer system including a processor and a memory, a display device, one or more USB peripherals. The system may include a local extender operable to couple to the host computer system and a remote extender operable to couple to the local extender and to the display device and the one or more peripherals, as shown in FIG. 3. The extender may extend the distance between the host computer and the display/peripherals beyond what is generally achievable through standard video/display and/or peripheral (keyboard, mouse, etc.) cables, which typically cover distances up to 10 ft. One example of an extended distance, as shown in FIG. 3, may be—but not limited to—between 10 and 1000 feet. Other extended distances covering over 10 feet in length are possible and are contemplated, including ranges of 10, 100 s, and/or thousands of meters. The local extender may include a first video converter and a host controller both of which may be operable to couple to the host computer system. The remote extender may include a second video converter operable to couple to the display device and a remote USB interface device operable to couple to the one or more peripherals. In one embodiment the USB interface device may be a Remote Root Hub.

In one embodiment the local extender may be comprised on the host computer system. In another embodiment the host computer system may be comprised on a card or "blade" which is installed in a chassis. In one embodiment, the local extender may simply be a component on the "blade". Similarly, in one embodiment the remote extender may be comprised in the display device, wherein the one or more peripherals may be coupled to the remote extender via connections on the display device. In other embodiments the remote extender may be comprised on the keyboard, or any other peripheral device.

The host computer system may generate a video signal intended for the display device, as well as one or more peripheral signals intended for the one or more peripherals. The first video converter of the local extender may receive the video signal, convert the signal to a form that is compatible with transmission over the cable, and transmit the signal to the second video converter in the remote extender. The USB host controller may receive the one or more peripheral signals from the host computer system over an internal computer bus, such as a PCI bus, convert the signals to a non-USB compliant bus protocol, such as Universal Serial Bus Extension (USBX) packets, and transmit the USBX packets to the remote USB interface device in the remote extender. In addition, the remote USB interface device may receive on or more peripheral signals from peripheral devices, typically input devices such as a mouse or keyboard.

The video data may comprise HSync and VSync video synchronization signals which may comprise pulses which may be converted from standard length pulses to short pulses by the local extender for transmission over the cable to the remote extender. The remote extender may further comprise a pulse shaper which may convert the short pulses back to standard length pulses for use by the display device. In one embodiment the HSync and VSync video synchronization signals may be transmitted over two of three twisted wire pairs used for transmitting the video signals. In an alternate embodiment the HSync and VSync video synchronization signals may be transmitted over one twisted wire pair, which is used to communicate the peripheral signals to the remote extender. In this case the HSync and VSync video synchronization signals may be received by the Remote Root Hub which may send the signals to the pulse shaper, described above.

In one embodiment the remote extender may further include three delay components operable to couple to the three twisted wire pairs, wherein the three delay components may be operable to synchronize the Red, Green, and Blue video signals to compensate for different time-of-flight values for each of the three twisted wire pairs. The remote extender may further comprise four equalization components coupled to the four twisted-pair wires, and which may compensate for attenuation of low (DC) and high frequency signals due to the length of the four twisted-pair wires.

It has been common practice in color broadcast television to break the color images down to luminance and chrominance information. In such instances a luminance signal provides information about the level of illumination (typically as a monochrome image representing the effective image information), while the chrominance signal provides information about the color, its hue and saturation. When combined together, the luminance information and chrominance information yield a complete color image. It is also well understood that the bandwidth of the color information may be reduced without diminishing the apparent (perceptible) resolution, as long as the bandwidth of the luminance signal is held at an adequately high level.

Figure 4:
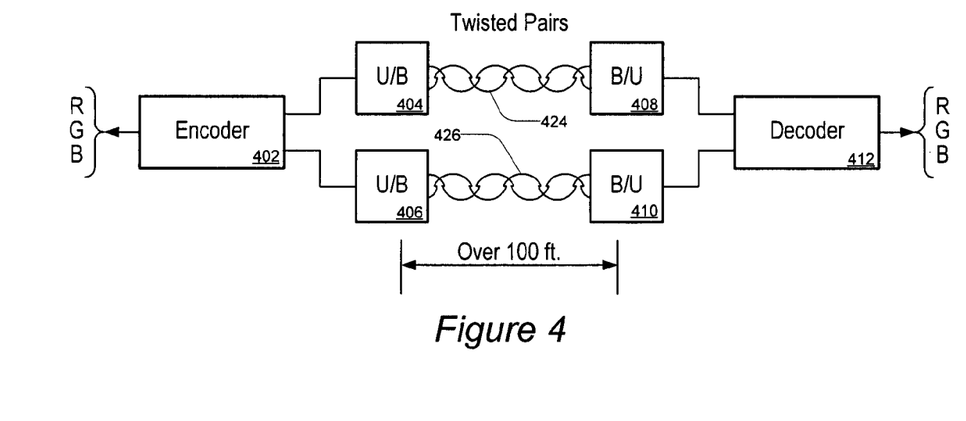
FIG. 4 shows of one embodiment of a system that transmits Y/C video signals over twisted-pair cabling.

In one embodiment, as shown in FIG. 4, RGB color video signals generated by the host computer may be encoded by encoder 402 into a different format, for example into the 'Y/C' video space, converted from an unbalanced, or single-ended, format to a balanced format through converters 404 and 406, and transmitted over twisted-pair wires 424 and 426, respectively, to a distance, which may be over 100 feet. Converters 408 and 410 at the other end of twisted-pair wires 424 and 426, respectively, may be used to convert the respective video signals back from a balanced to unbalanced format, following which the encoded video signal may be decoded by decoder 412 into the RGB component signals. The video space referred to as 'Y/C' may be any space wherein the RGB component signals are converted into a 'Y' or luminance signal and a 'C' or chrominance signal, as previously described.

Figure 5:
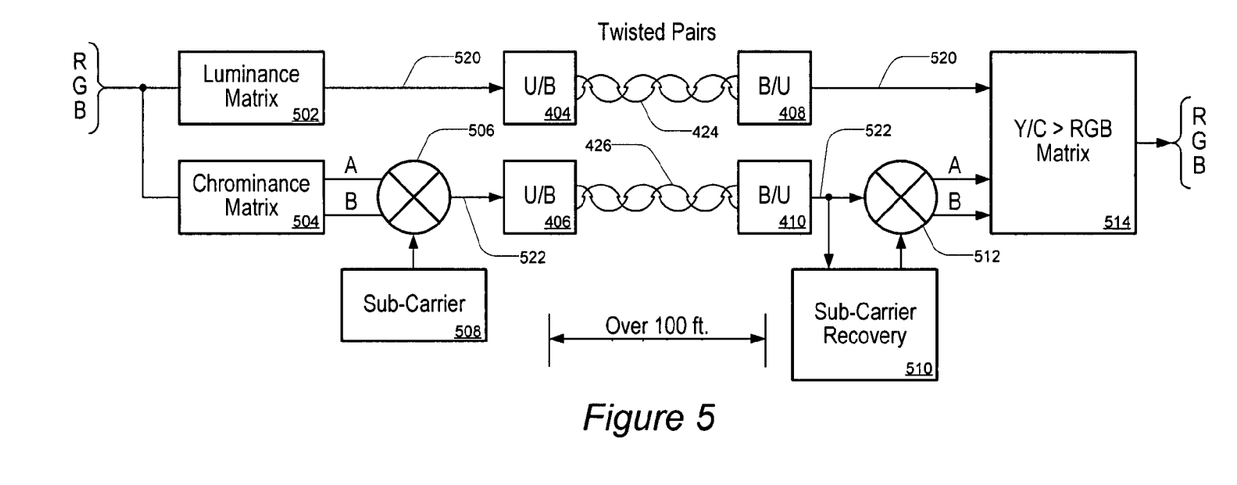
FIG. 5 shows in more detail the embodiment of FIG. 4.

In one embodiment, as illustrated in FIG. 5, a standard Computer Video Output consists of RGB and Synchronization signals, which are encoded at or near the computer into a luminance matrix 502 providing single-ended luminance signal 520, and two single-ended color difference signals, shown as chrominance matrix 504. The two single-ended color difference signals may then be combined through a quadrature modulation process using quadrature modulator 506 and sub-carrier 508, to create a single single-ended video chrominance signal 522. Luminance signal 520 and chrominance signal 522 may be converted from single-ended (unbalanced) to balanced signals (U/B) through respective converters 404 and 406, and may be transmitted over respective twisted-pair wires 424 and 426 some distance, which may be over 100 feet. At the destination, the balanced signals may be converted back from balanced to unbalanced (B/U), or single-ended, format through converters 408 and 410. Subsequently, single single-ended video chrominance signal 522 may be used to recover sub-carrier 508 and the two color difference signals through quadrature demodulator 512 using sub-carrier 508. The single-ended luminance signal and two single-ended color difference signals may then be decoded into the standard monitor format of RGB and Sync, using decoder 514 close to the Monitor. Subsequently, the RGB signals may be processed and delivered to the Monitor. While FIG. 4 and FIG. 5 illustrate an extended distance of over 100 feet between the encoder and the decoder, other extended distances covering over 10 ft. in length are possible and are contemplated.

Figure 6:
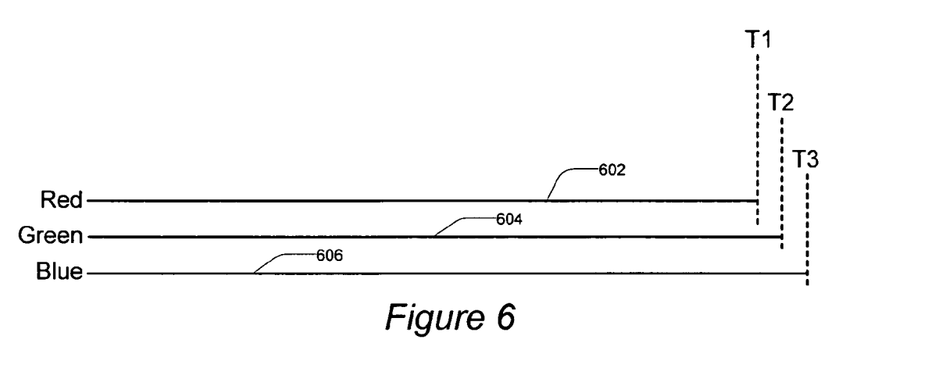
FIG. 6 illustrates a timing delay between individual RGB color signals transferred on respective individual cables, according to prior art.

An alternate current practice in sending RGB video over Communications Cable includes transferring the individual color signals on respective individual cables, as illustrated in FIG. 6. In the configuration shown in FIG. 6, each color component comprised in the RGB signal, that is, Red, Green, and Blue, is transmitted over its respective twisted-pair cable 602, 604, and 606, respectively. Twisted-pair cables 602, 604 and 606 are each typically of different length due to the different twist rates employed to reduce crosstalk in each respective cable bundle. The difference in length between twisted-pair cables 602, 604, and 606 may result in a different respective time-of-flight for each twisted-pair, leading to different arrival times for the corresponding signals at the far end, with greater distances resulting in greater arrival time variations. Thus T1, T2, and T3 generally constitute the original RGB signal spread out in time.

Figure 7:
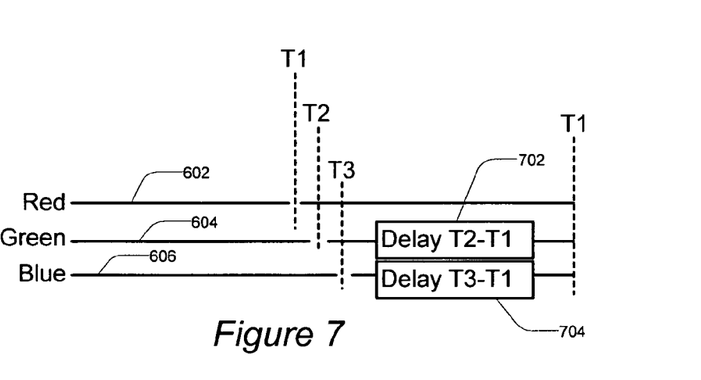
FIG. 7 illustrates variable delay lines implemented to compensate for the timing delay shown in FIG. 6, according to prior art.

One practical solution for counteracting the spread in arrival time may be to insert respective variable delays into the two twisted-pair cables that both have lesser time of flight than the third twisted-pair cable. As illustrated in FIG. 7, if propagation of the Red signal over twisted-pair cable 602 takes longer than the respective propagation of both the Green signal over twisted-pair cable 604 and the Blue signal over twisted-pair cable 606, twisted-pair cables 604 and 606 may be designed to exhibit delays illustrated as lumped path delays 702 and 704, respectively, in order to insure that the three signals—Red, Green, and Blue—are color aligned. For illustrative purposes the Red signal is shown to have the slowest time-of-flight, thereby leading to the Green and Blue signals being delayed in reference to the Red signal, such that all three signals are again "in time" with respect to each other. In case the Blue or the Green signal is the slowest, a similar scheme may be employed delay the other color signals with respect to the slowest color signal. In other words, delay elements may be inserted according to which signal is the slowest, which may be any of the three signals, with the two faster signals being delayed. However, introducing delays 702 and 704 may limit the bandwidth of the signals passing through delayed lines 604 and 606, respectively. Such a limitation in bandwidth may result in either a requirement to lower the resolution of the carried (transmitted) image, or a requirement to shorten the distance across which the image is to be transmitted.

In one set of embodiments, the color signals may be redistributed on the twisted-pair cables in a manner that increases the effective bandwidth and thus enables transmission of color video signals over longer distances and at higher resolutions than is customarily achieved using, for example, Category type communications cables. As previously mentioned it is possible, as has been frequently implemented, to break the color images down into luminance and chrominance information, where the bandwidth of the color information may be reduced without diminishing the apparent (perceptible) resolution, as long as the bandwidth of the luminance signal is held at an adequately high level.

In one embodiment, the three primary color signals, Red, Green and Blue, are matrixed into a luminance and chrominance signal set for transmission over time shifting Category Communications cable. At the receiving end of the cable, the signals may be time corrected and de-matrixed back into the three primary colors for delivery to a monitor. As previously noted, the single-ended luminance and chrominance signals may be converted to a balanced format prior to transmission, and the balanced signals may be converted back to single-ended signals upon reception. Without respect to any specific color and/or color combination, three new signals X, Y, and Z may be generated as follows:

(1) Z (Luminance)=R+B+G
(2) X (Chrominance 1)=R−Z=−(B+G)
(3) Y (Chrominance 2)=B−Z=−(R+G).

The three signals Z, X and Y may be transmitted over respective Category communications cables with the Z signal transmitted on the shortest twisted-pair cable, and the X and Y signals transmitted on the other two, respectively longer twisted-pair cables. Upon receipt at the other end of each respective twisted-pair cable, the Z, X and Y signals may be 'time aligned' using standard delay lines on the two longest lines. Once the three signals have been time aligned, they may be de-matrixed using the following functions:

(4) Z+X=R
(5) Z+Y=B
(6) Z−B−R=G, thus obtaining and subsequently outputting the original RGB signal.

Figure 8:
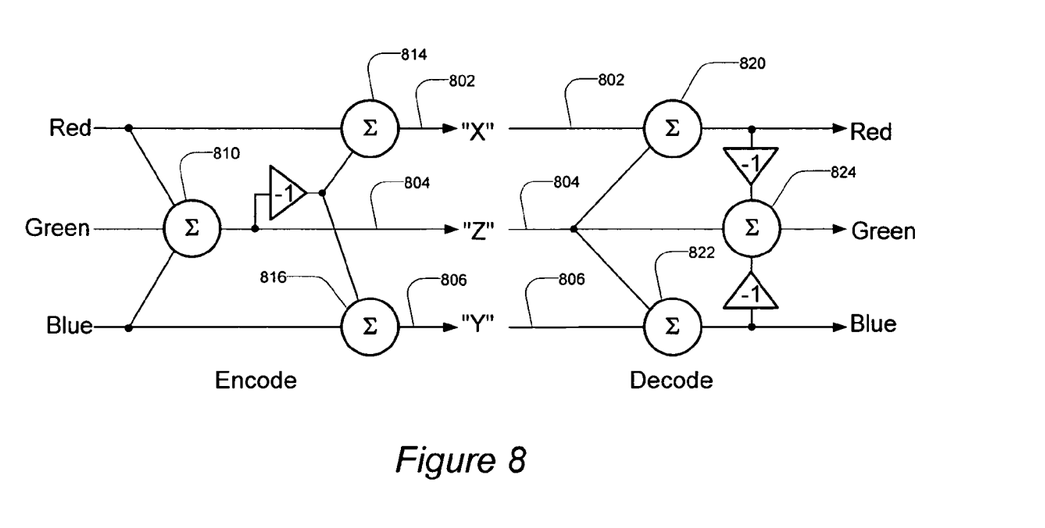
FIG. 8 shows one embodiment of RGB video signal encoding for transfer over twisted-pair cables, and subsequent decoding of the RGB video signal.

FIG. 8 illustrates one embodiment of the encoding and decoding of the Z, X and Y signals for transmission over Category communications cables of varying length, in this case lines 802 and 806 each being longer than line 804. The Red, Green and Blue color components may be summed through summing node 810, into signal Z. Signal Z may be inverted and the inverted Z signal may be summed with the Red signal through summing node 814 to produce the X signal. Similarly, the inverted Z signal may be summed with the Blue signal through summing node 816 to produce the X signal. The X and Y signals are transmitted over twisted-pair cables 802 and 806, respectively, which may each be longer than twisted-pair cable 804 over which the Z signal is transmitted. On the receiving end, the Red signal may be obtained by summing the Z signal plus the X signal through summing node 820, and the Blue signal may be obtained by summing the Z signal with the Y signal through summing node 822. The Green signal may then be obtained by summing the inverted Red Signal and the inverted Green signal and the Z signal through summing node 824.

The particular combination or order of the component video signals is not critical to the performance of the system. In addition, other variations of summing and differencing the components may be implemented. For example, in an alternate embodiment, the X signal may be obtained by summing the Green signal with the inverse of the Z signal, and so forth.

The system and methods as described above may therefore facilitate the transmission of RGB video signals over category 5 cable (and/or category 6 cable, and/or category 7 cable) in an encoded video format rather than raw RGB component format. Furthermore, the luminance signal may be transmitted over a non time-corrected line in order to retain bandwidth, while the color difference signals may be transmitted over time-corrected lines, thereby reducing the visual degradation of the signals. Finally, equal levels of the Red, Green and Blue component signals may be used when creating the luminance and color difference signals. In other words, various embodiments of the systems and methods described above may facilitate using Y/C video for computer graphics, and using twisted-pair cabling for the transfer of Y/C computer graphic signals over a distance.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A video transmission system for transmitting computer video signals, the system comprising:
   a source of computer video signals including analog red, green, and blue video signals; and
   a video transmitter comprising:
      a video encoder configured to receive the analog red, green and blue video signals and convert the analog red, green and blue video signals into a single-ended analog luminance signal and a pair of single-ended analog color difference signals; and
      a converter configured to receive the single-ended analog luminance signal and the pair of single-ended analog color difference signals, and further configured to generate a balanced analog luminance signal from the single-ended analog luminance signal and a respective pair of balanced analog color difference signals from the pair of single-ended analog color difference signals; and
   a plurality of twisted-pair conductors, one end of each of the plurality of twisted-pair conductors configured to couple to the converter, wherein the video transmitter is configured to transmit the balanced analog luminance signal over a first one of the plurality of twisted-pair conductors, and transmit the pair of balanced analog color difference signals over respective second and third ones of the plurality of twisted-pair conductors;
   wherein a length of the first one of the plurality of twisted-pair conductors is shorter than a respective length of the respective second and third ones of the plurality of twisted-pair conductors.

2. The system of claim 1, wherein the length of the first one of the plurality of twisted-pair conductors exceeds 100 ft.

3. The system of claim 1, wherein the single-ended analog luminance signal comprises a sum of the analog red, green, and blue video signals.

4. The system of claim 3, wherein one of the pair of single-ended analog color difference signals comprises an inverse of a sum of the analog green video signal and the analog blue video signal, and the other of the pair of single-ended analog color difference signals comprises an inverse of a sum of the analog green video signal and the analog red video signal.

5. The system of claim 3, wherein one of the pair of single-ended analog color difference signals comprises an inverse of a sum of the analog blue video signal and the analog green video signal, and the other of the pair of single-ended color difference signals comprises an inverse of a sum of the analog blue video signal and the analog red video signal.

6. The system of claim 3, wherein one of the pair of single-ended analog color difference signals comprises an inverse of a sum of the analog red video signal and the analog green video signal, and the other of the pair of single-ended color difference signals comprises an inverse of a sum of the analog red video signal and the analog blue video signal.

7. The system of claim 1, further comprising:
   a video receiver configured to couple to the other end of each of the plurality of twisted-pair conductors and comprising:
      a converter configured to receive the balanced analog luminance signal and generate the single-ended analog luminance signal from the balanced analog luminance signal, and further configured to receive the respective pair of balanced analog color difference signals and generate the pair of single-ended analog color difference signals from the respective pair of balanced analog color difference signals; and
      a video decoder configured to receive the single-ended analog luminance signal and the pair of single-ended analog color difference signals, and further configured to convert the single-ended analog luminance signal and the pair of single-ended analog color difference signals into the analog red, green and blue video signals.

8. The system of claim 7, wherein the video decoder is configured to provide the analog red, green and blue video signals to a computer monitor.

9. A method for transmitting computer video signals, the method comprising:
   receiving analog red, green, and blue video signals;
   converting analog the red, green and blue video signals into a single-ended analog luminance signal and a pair of single-ended analog color difference signals;
   generating a balanced analog luminance signal from the single-ended analog luminance signal;
   generating a respective pair of balanced analog color difference signals from the pair of single-ended analog color difference signals;
   transmitting the balanced analog luminance signal over a first one of a plurality of twisted-pair conductors; and
   transmitting the respective pair of balanced analog color difference signals over respective second and third ones of the plurality of twisted-pair conductors;
   wherein a length of the first one of the plurality of twisted-pair conductors is shorter than a respective length of the respective second and third ones of the plurality of twisted-pair conductors, thereby retaining bandwidth and reducing visual degradation of the transmitted balanced analog luminance signal and the transmitted respective pair of balanced analog color difference signals.

10. The method of claim 9, wherein the length of the first one of the plurality of twisted-pair conductors exceeds 100 ft.

11. The method of claim 9, wherein said converting the analog red, green and blue video signals comprises summing the analog red, green and blue video signals to obtain the single-ended analog luminance signal.

12. The method of claim 11, wherein said converting the analog red, green and blue video signals further comprises:
   summing the analog green video signal and the analog blue video signal to obtain a first combined signal;
   inverting the combined signal to obtain one of the pair of single-ended analog color difference signals;
   summing the analog green video signal and the analog red video signal to obtain a second combined signal; and
   inverting the second combined signal to obtain the other of the pair of single-ended analog color difference signals.

13. The method of claim 11, wherein said converting the analog red, green and blue video signals further comprises:
   summing the analog blue video signal and the analog green video signal to obtain a first combined signal;
   inverting the combined signal to obtain one of the pair of analog single-ended color difference signals;
   summing the analog blue video signal and the analog red video signal to obtain a second combined signal; and
   inverting the second combined signal to obtain the other of the pair of single-ended analog color difference signals.

14. The method of claim 11, wherein said converting the analog red, green and blue video signals further comprises:
   summing the analog red video signal and the analog green video signal to obtain a first combined signal;
   inverting the combined signal to obtain one of the pair of single-ended analog color difference signals;

summing the analog red video signal and the analog blue video signal to obtain a second combined signal; and
inverting the second combined signal to obtain the other of the pair of single-ended analog color difference signals.

15. The method of claim 9 further comprising:
receiving the balanced analog luminance signal over the first one of the plurality of twisted-pair conductors;
generating the single-ended analog luminance signal from the balanced analog luminance signal;
receiving the respective pair of balanced analog color difference signals over the respective second and third ones of the plurality of twisted-pair conductors;
generating the pair of single-ended analog color difference signals from the respective pair of balanced analog color difference signals; and
converting the single-ended analog luminance signal and the pair of single-ended analog color difference signals into the analog red, green and blue video signals.

16. The method of claim 15, wherein said converting the single-ended analog luminance signal and the pair of single-ended analog color difference signals into the analog red, green and blue video signals comprises:
summing the single-ended analog luminance signal and one of the pair of single-ended analog color difference signal to obtain one of the analog red, green and blue video signals;
summing the single-ended analog luminance signal and the other of the pair of single-ended analog color difference signal to obtain one of the remaining two of the analog red, green and blue video signals;
inverting each of the pair of single-ended analog color difference signals, and summing the analog luminance signal and the inverted pair of single-ended analog color difference signals to obtain the remaining one of the analog red, green and blue video signals.

17. A video transmission system for transmitting computer video signals, the system comprising:
a source of computer video signals including analog red, green, and blue video signals; and
a video transmitter comprising:
a video encoder configured to convert the analog red, green and blue video signals into a single-ended analog luminance signal and a pair of single-ended analog color difference signals;
a quadrature modulator configured to receive the pair of single-ended analog color difference signals, and further configured to generate a single-ended analog chrominance signal from the pair of single-ended analog color difference signals; and
a converter configured to receive the single-ended analog luminance signal and the single-ended analog chrominance signal, and further configured to generate a balanced analog luminance signal from the single-ended analog luminance signal and a balanced analog chrominance signal from the single-ended analog chrominance signal; and
a pair of twisted-pair conductors, one end of each of the pair of twisted-pair conductors configured to couple to the converter, wherein the video transmitter is configured to transmit the balanced analog luminance signal over one of the pair of twisted-pair conductors, and transmit the balanced analog chrominance signal over the other of the pair of twisted-pair conductors.

18. The system of claim 17, wherein a length of each of the pair of twisted-pair conductors exceeds 100 feet.

19. The system of claim 17, further comprising:
a video receiver configured to couple to the other end of each of the pair of twisted-pair conductors and comprising:
a converter configured to receive the balanced analog luminance signal and generate the single-ended analog luminance signal from the balanced analog luminance signal, and further configured to receive the balanced analog chrominance signal and generate the single-ended analog chrominance signal from the balanced analog chrominance signal;
a quadrature demodulator configured to receive the balanced analog chrominance signal, and further configured to generate the pair of single-ended analog color difference signals from the balanced analog chrominance signal; and
a video decoder configured to
receive the single-ended analog luminance signal and the pair of single-ended analog color difference signals, and further configured to convert the single-ended analog luminance signal and the pair of single-ended analog color difference signals into the analog red, green and blue video signals.

20. The system of claim 19, wherein the video decoder is configured to provide the analog red, green and blue video signals to a computer monitor.

21. A system comprising:
a computing system configured to generate computer video signals including analog red, green, and blue video signals;
a transmitter extender device configured to couple to the central processing unit and further configured to receive the analog red, green and blue video signals and convert the analog red, green and blue video signals into a balanced analog luminance signal and a respective pair of balanced analog color difference signals;
a plurality of twisted-pair conductors, one end of each of the plurality of twisted-pair conductors configured to couple to the transmitter extender device, wherein the video transmitter is configured to transmit the balanced analog luminance signal over a first one of the plurality of twisted-pair conductors, and transmit the pair of balanced analog color difference signals over respective second and third ones of the plurality of twisted-pair conductors;
a receiving extender device configured to couple to the transmitter extender device via the other end of each of the plurality of twisted-pair conductors, and further configured to receive the balanced analog luminance signal and the respective pair of balanced analog color difference signals and generate the analog red, green and blue video signals; and
a display device, wherein the receiving extender device is further configured to provide the analog red, green and blue video signals to the display device;
wherein a length of the first one of the plurality of twisted-pair conductors is shorter than a respective length of the respective second and third ones of the plurality of twisted-pair conductors.

22. The system of claim 21,
wherein the transmitter extender device comprises:
a video encoder configured to receive the analog red, green and blue video signals and convert the analog red, green and blue video signals into a single-ended analog luminance signal and a pair of single-ended analog color difference signals; and
a transmitter converter configured to receive the single-ended analog luminance signal and the pair of single-ended analog color difference signals, and further configured to generate a balanced analog luminance signal from the single-ended analog luminance signal and a respective pair of balanced analog color difference signals from the pair of single-ended analog color difference signals;

wherein the receiving extender device comprises:

a receiver converter configured to receive the balanced analog luminance signal and generate the single-ended analog luminance signal from the balanced analog luminance signal, and further configured to receive the respective pair of balanced analog color difference signals and generate the pair of single-ended analog color difference signals from the respective pair of balanced analog color difference signals; and a video decoder configured to receive the single-ended analog luminance signal and the pair of single-ended analog color difference signals, and further configured to convert the single-ended analog luminance signal and the pair of single-ended analog color difference signals into the analog red, green and blue video signals.

23. The computing system of claim 21, further comprising a keyboard and a mouse, each configured to couple to the receiving extender device.

* * * * *